March 31, 1931.  A. W. SCOTT  1,798,855
VALVE AND HEAD CONSTRUCTION
Filed March 18, 1929
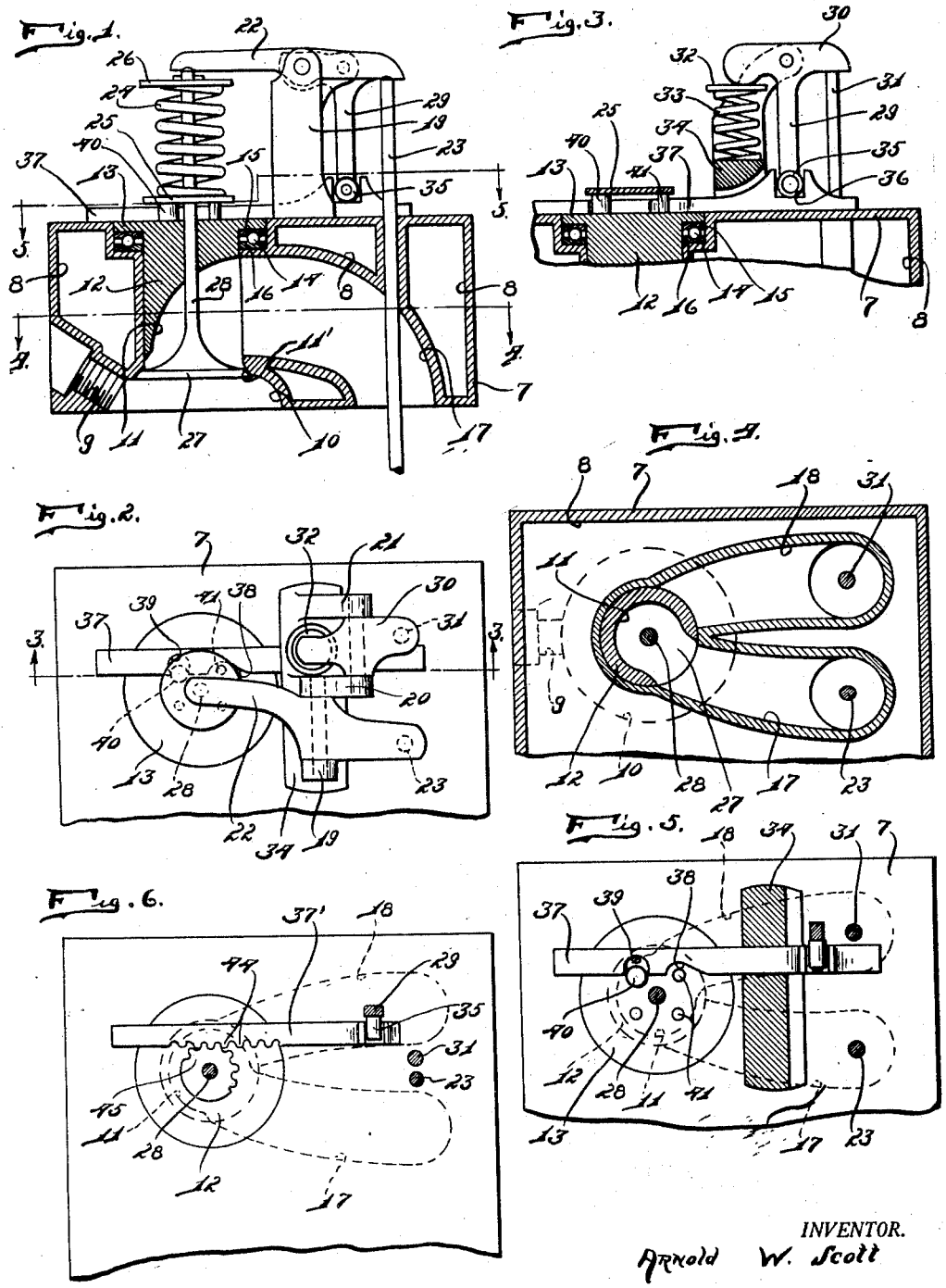
INVENTOR.
Arnold W. Scott
BY
ATTORNEY.

Patented Mar. 31, 1931

1,798,855

UNITED STATES PATENT OFFICE

ARNOLD W. SCOTT, OF DETROIT, MICHIGAN

VALVE AND HEAD CONSTRUCTION

Application filed March 18, 1929. Serial No. 347,880.

My invention relates to a new and useful improvement in a valve and head construction and has for its object the provision of such a structure as will permit the use of a four cycle engine with a single valve communicating with the combustion chamber.

Another object of the invention is to provide a valve construction in which warping and overheating of the valve will be eliminated or at least reduced to a minimum.

It is another object of the present invention to provide a construction in which a thorough vaporization of the fuel may be effected.

Another object of the invention is the provision in an engine, of a combustion chamber which may be easily constructed and quickly machined.

Another object of the invention is the provision of a structure in which valves of a maximum size may be used and scavenging and intake increased.

Another object of the invention is the provision of a construction in which the valve will be rotated while in use so that a proper sitting of the valve may be maintained at all times.

Another object of the invention is the provision of mechanism whereby communication with the combustion chamber and an intake or exhaust manifold, may alternately and quickly be established.

Other objects will appear hereinafter.

The invention consists in the combination and arrangement of parts hereinafter described and claimed.

The invention will be best understood by a reference to the accompanying drawings which form a part of this specification, and in which, Fig. 1 is a sectional view of the invention.

Fig. 2 is a top plan view of an engine head embodying the invention.

Fig. 3 is a sectional view taken on line 3—3 of Fig. 2.

Fig. 4 is a sectional view taken on line 4—4 of Fig. 1.

Fig. 5 is a sectional view taken on line 5—5 of Fig. 1.

Fig. 6 is a view similar to Fig. 5 showing a modified form of construction.

In the drawings I have illustrated the invention used with an engine head 7 having the water chambers 8 therein for cooling purposes and provided with a threaded opening 9 in which the spark plug may be mounted so as to extend into the combustion chamber 10, which would be located over the cylinder of the engine. A port 11 serves to communicate the combustion chamber 10 with the recess or pocket 11 formed in a rotatable valve block 12. A flange 13 is formed on the head of the block 12 and roller bearings 14 engaging the race rings 15 and 16 serve to support the head 12 in position and reduce the friction incident to rotation of the head 12. Formed in the head 7 is a pair of passages 17 and 18, one of which would communicate with the intake manifold of the engine and the other with the exhaust manifold. Projecting upwardly from the top of the head 7 are supporting standards 19, 20 and 21. Rockably mounted between the standards 19 and 20 and pivoted thereon is a rocker arm 22 engageable with a push rod 23 which is actuated in the customary manner of actuating a push rod on the conventional type of internal combustion engine, that is, by means of the cam on the cam shaft. A spring 24 engages at one end the washer 25 and the other end to the washer 26 and serves normally to retain the valve 27 which carries the valve stem 28 in closed position. This valve is moved to open position upon a rocking of the rocker arm 22, this rocker arm engaging the upper end of the stem 28. The valve 27 controls the communication of the recess 11 with the combustion engine and this recess 11 communicates with either of the passages 17 or 18 and as to which of the passages 17 or 18 the recess 11 communicates with, may be determined by the operation of the engine, so that a single valve is used for controlling the intake and the exhaust on a four cycle internal combustion engine.

Rockably mounted between the supports 20 and 21 which are extended laterally at their upper ends, is an arm 29 carrying a cross head 30. One end of this cross head is engageable by the push rod 31 which is actuated by the cam shaft and the other end engages a washer 32 positioned on the spring 33, the opposite end of which engages a stationary portion 34 of the engine head. The lower end of the arm 29 is provided with a laterally extending roller bearing 35 which, in the preferred form shown, engages in a notch 36 formed in the arm 37. This arm 37 is provided with the notches 38 and 39, the notch 39 being considerably deeper than the notch 38. Projecting upwardly from the upper end of the head 12 are pins 40 and 41. The pins 41 serve to support the washer 25 above, so as to be free from contact with the arm 37. The pin 40 is adapted to engage in the notch 39.

In operation, when the push rod 31 is moved longitudinally so as to rock the cross head 30 against the compression of the spring 33, the arm 37 will be moved outwardly so as to effect a rotation of the head 12 and thus bring the recess 11 into communication with the passage 17. When the arm 29 is rocked in the opposite direction in response to the pressure of the spring 33, the head 12 will also be rocked so as to bring the recess 11 into communication with the passage 18. Thus there is a means of alternately establishing communication between the combustion chamber and the passages 17 and 18. The notch 38 serves to form clearance for the pins 41 so that no interference with the rotation of the head 12 may be effected.

The form shown in Fig. 6 is as illustrated for the preferred form excepting that the rod 37' is provided with teeth 44 so as to form a sort of rack bar meshing with the gear 45 which is fixedly mounted on the head 12.

The invention may be used on engines now in operation by modifying the heads of the engine in the manner indicated. The invention may also be used on engines of the self-igniting type, the Diesel type and spark igniting type, either air or water cooled.

While I have illustrated and described the preferred form of my invention, I do not wish to limit myself to the precise details of structure shown but desire to avail myself of such variations and modifications as come within the scope of the appended claims.

Having thus described my invention, what I claim as new and desire to secure by Letters Patent is:—

1. In a four cycle internal combustion engine having a combustion chamber; a head provided with a pair of separate passages; a valve controlling communication of each of said passages with said combustion chamber independently; rotatable means for selecting the passage to be communicated through said valve with said combustion chamber; a rockable member; and means cooperating with said rockable member for operating said rotatable selecting means; and rockable means for operating said control valve.

2. In an internal combustion engine having a combustion chamber; a head provided with a pair of separate passages; a valve for controlling communication of each of said passages with said combustion chamber independently; rotatable means for selecting the passages to be communicated with said combustion chamber; means for opening said valve, said valve being normally spring held in closed position; a rockable member; and means co-operating with said rockable member for rotating said selecting means alternately in opposite directions upon the rocking of said rockable member.

3. In an internal combustion engine having a combustion chamber: a head having a pair of separate passages formed therein and adapted for communicating with said combustion chamber through a port; a valve for closing said port; a spring for normally retaining said valve in closed position; means for moving said valve to open position against the tension of said spring; a rotatable valve block having a recess formed in one side, adapted upon rotation to one position, for establishing communication of one of said passages with said port and upon rotation to another position for establishing communication of the other of said passages with said port; reciprocating means for moving said rotatable valve block to either position; and rockable means for actuating said reciprocating means.

4. In an internal combustion engine having a combustion chamber: a head having a pair of separate passages formed therein and adapted for communicating with said combustion chamber through a port; a valve for closing said port; a spring for normally retaining said valve in closed position; means for moving said valve to open position; a rotatable valve block adapted upon rotation to one position for establishing communication of one of said passages with said port and upon rotation to another position for establishing communication of the other of said passages to said port; reciprocating means for moving said rotatable valve block to either position; a rocker; and means co-operating with said rocker for operating said reciprocating means.

5. In an internal combustion engine having a combustion chamber: a head having a pair of separate passages formed therein and adapted for communicating with said combustion chamber through a port; a valve for closing said port; a spring for normally retaining said valve in closed position; means for moving said valve to open position; a rotatable valve block adapted upon rotation to one position for establishing communication of one of said passages with said port and upon rotation to another position for establishing communication of the other of said passages to said port; reciprocating means for moving said rotatable valve block to either position; a rocker; and means co-operating with said rocker for operating said reciprocating means; means for rocking said rocker in one direction; and resilient means for returning said rocker to normal position as rocking in said direction.

6. In an internal combusition engine having a combustion chamber: a head having a pair of separate passages formed therein and adapted for communicating with said combustion chamber through a port; a valve for closing said port; a spring for normally retaining said valve in closed position; means for moving said valve to open position; a rotatable valve block adapted upon rotation to one position for establishing communication of one of said passages with said port and upon rotation to another position for establishing communication of the other of said passages to said port; reciprocating means for moving said rotatable valve block to either position; a rocker; and means co-operating with said rocker for operating said reciprocating means, said reciprocating means riding on the upper surface of said head; and means positioned above said reciprocating means and co-operating with said head to provide a guide for said reciprocating means in its reciprocating movements.

In testimony whereof I have signed the foregoing specification.

ARNOLD W. SCOTT.